Figure 1A:
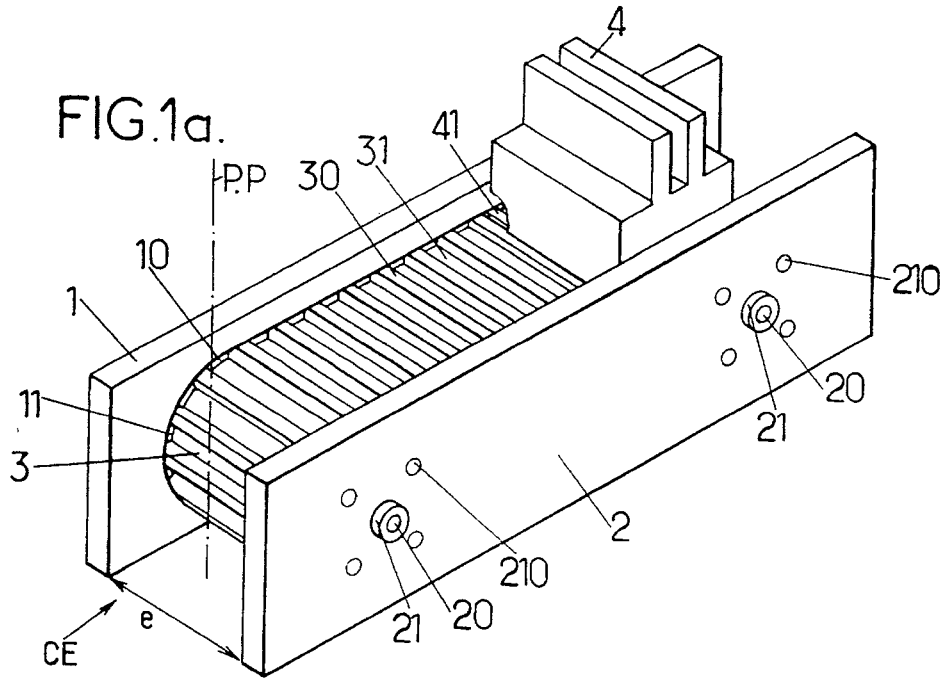

United States Patent [19]
Soriano et al.

[11] Patent Number: 5,529,168
[45] Date of Patent: Jun. 25, 1996

[54] SYSTEM FOR TRANSLATIONALLY/ROTATIONALLY CONVEYING A SUPPORT MEMBER

[75] Inventors: Louis Soriano, Aubagne; Jackie Orange, Marseilles, both of France

[73] Assignee: L'Entreprise Industrielle, France

[21] Appl. No.: 313,243

[22] PCT Filed: Feb. 3, 1994

[86] PCT No.: PCT/FR94/00132

§ 371 Date: Oct. 3, 1994

§ 102(e) Date: Oct. 3, 1994

[87] PCT Pub. No.: WO94/18102

PCT Pub. Date: Aug. 18, 1994

[30] Foreign Application Priority Data

Feb. 4, 1993 [FR] France ................. 93 01227

[51] Int. Cl.⁶ ............................................... B65G 37/00
[52] U.S. Cl. ............... 198/465.1; 198/795; 198/803.01
[58] Field of Search ........................ 198/465.1, 795, 198/803.01

[56] References Cited

U.S. PATENT DOCUMENTS

| | | | |
|---|---|---|---|
| 3,858,519 | 1/1975 | Masino et al. | 198/795 |
| 3,860,107 | 1/1975 | Cioni et al. | 198/803.01 |
| 4,162,723 | 7/1979 | Kupper | 198/795 |
| 5,064,054 | 11/1991 | Hoppmann et al. | 198/795 |
| 5,464,090 | 11/1995 | Lucas | 198/803.01 |

Primary Examiner—Joseph E. Valenza
Attorney, Agent, or Firm—Larson and Taylor

[57] ABSTRACT

A translational/rotational support member conveying system including at least one basic conveyor (CE) consisting of two shields (1,2) each provided with opposed rectilinear (10) and/or circular (11) guide channels, as well as a translating and/or rotating notched belt (3) moving near the guide channels. The system further includes one or more support members (4) with two or more lower pegs (41) engaging the guide channels and the belt notches (30,31) in order translationally and/or rotationally to drive and guide said support member(s) (4). The system may be used in a flexible linear wiring assembly.

9 Claims, 6 Drawing Sheets

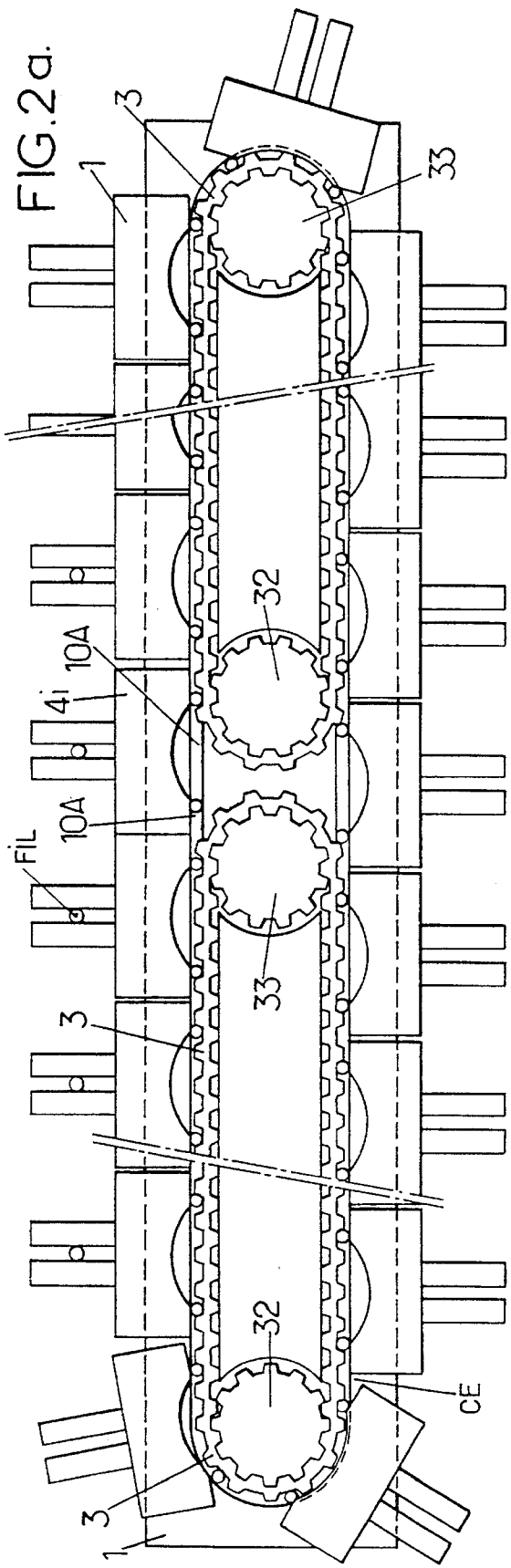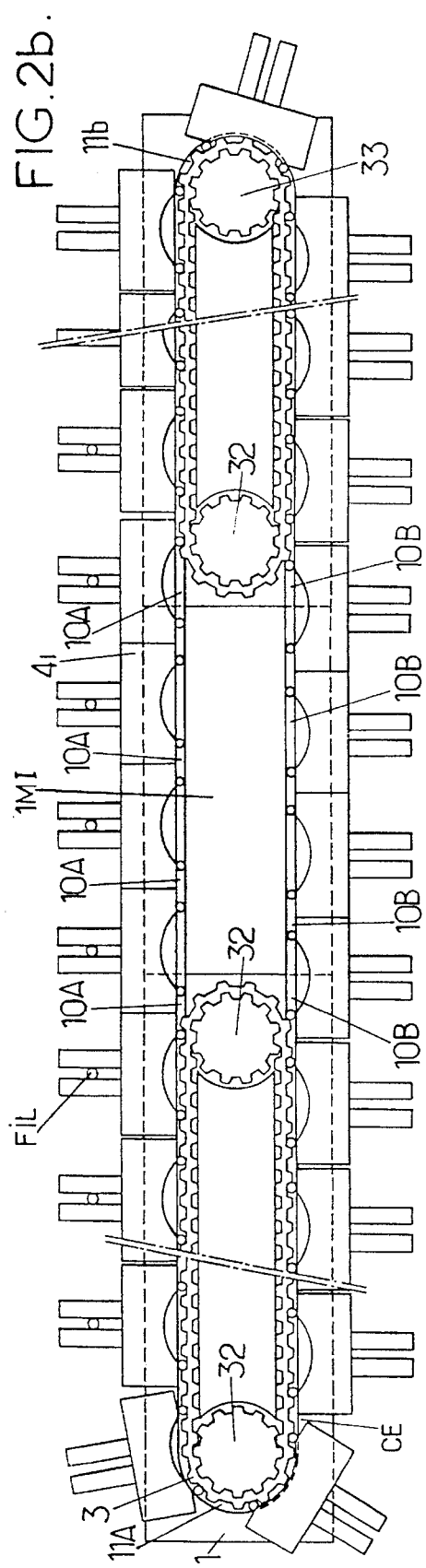

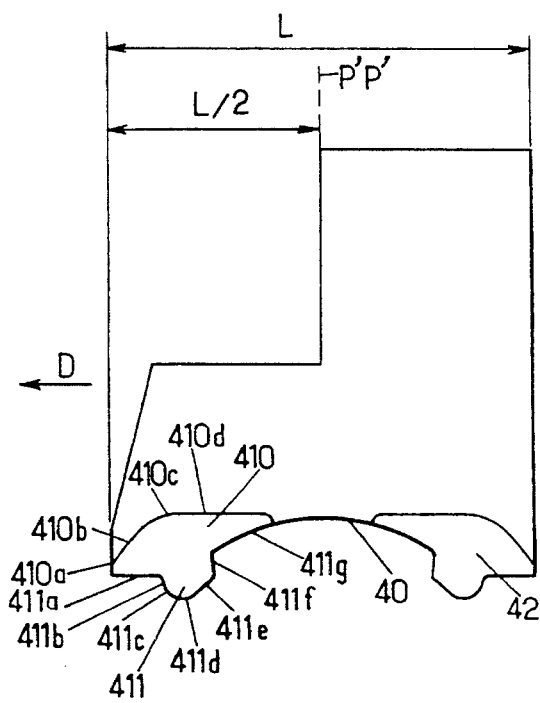
FIG.3b.
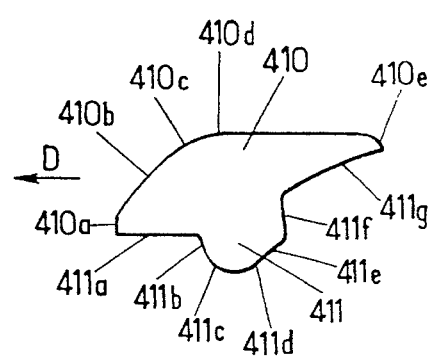
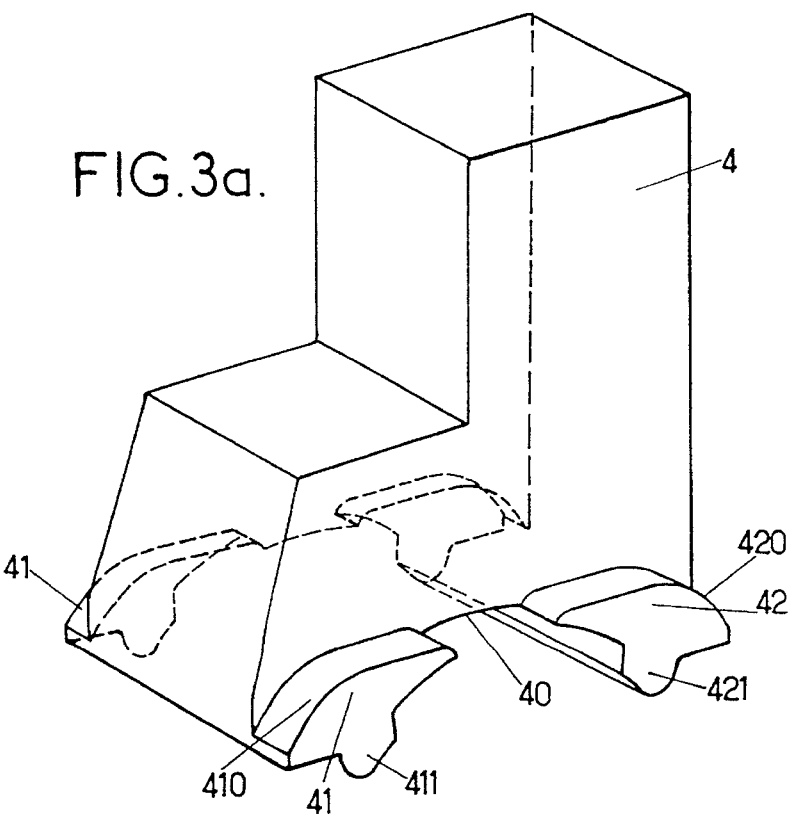
FIG.3a.

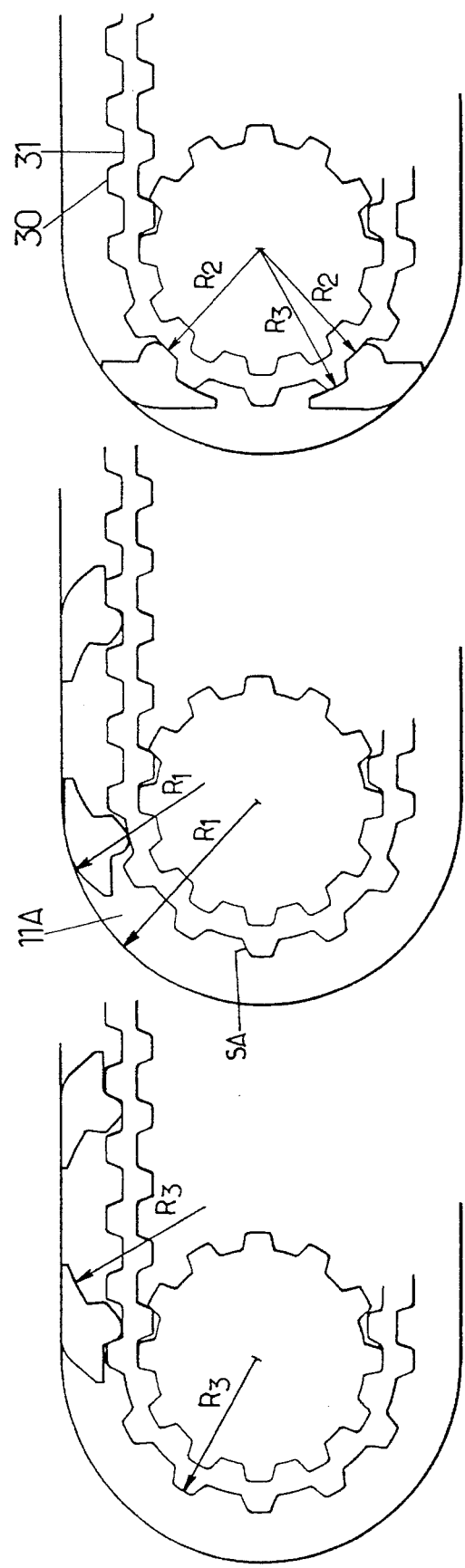

SYSTEM FOR TRANSLATIONALLY/ROTATIONALLY CONVEYING A SUPPORT MEMBER

The present invention relates to a system for translationally/rotationally conveying a support member.

Current conveying systems, when these are used in automatic multistation treatment machines, require, to an increasingly significant extent, the ability to employ, and to move precisely, one or more successive support members. In the technology of flexible linear-cabling plants, it is essential, over and above the aforementioned necessary precision of movement, that great utilization flexibility should be possible, especially as regards the recycling of the supports after a treatment or manufacturing cycle.

Among the known techniques for producing such conveying systems, it has been proposed to produce these systems by combining conveyor belts equipped with systems of studs, the supports being able to be slidingly engaged in the aforementioned studs and then driven by the latter, see, in particular, European Patent Application EP-88 430,017. However, in this type of embodiment, the attachment of the supports to the conveyor belt cannot and must not be rigid, so that, in particular, the supports can be recycled after a utilization cycle. For this reason, in the absence of this attachment having a rigid character, recycling can be envisaged only by means of conveyors located in a configuration in one and the same plane, a horizontal plane, by successive translations. Such installations are therefore not very flexible operationally, because of the inevitable floor-area requirements of this type of configuration, see German Patent Application DE-3,327,583.

A system has also been proposed, in Japanese Patent Application JP-A-62 60 708, for translationally/rotationally conveying a support member, comprising two side plates facing each other, each side plate being equipped with straight or circular facing guide channels, and a notched belt moving translationally and/or rotationally near the guide channels. One or more support members, whose base includes teeth engaged in the guide channels and the notches of the notched belt, are driven and guided translationally and/or rotationally. However, the engagement of the teeth of the supports in the notches of the notched belt is not complete and there is a partial overlap and a space between support tooth and notch or step of the notched belt in order to take into account the elongation of the notched belt when it is rotating, the consequence of this being a variation in the positioning of each support when these are being rotated.

Such a device therefore does not permit perfectly stable positioning of the supports on the notched belt, the consequence of this being a limitation in the translational/rotational drive speeds because of the non-negligible risks of vibration of the assembly.

The object of the present invention is to remedy the aforementioned drawbacks by employing a conveying system, of modular character, in which the support elements, although not rigidly integral with a drive belt, can be moved translationally and/or rotationally, whatever the orientation of each support member with respect to the drive belt.

Another object of the present invention is, furthermore, to employ a conveying system, of modular character, in which the configuration of the set of modules, which is formed by one or more elementary conveyors, can be produced in one plane having, in particular, a vertical orientation, this enabling the floor-area requirement of such a conveying system to be substantially reduced.

The system for translationally/rotationally conveying a support member, which is the subject of the present invention, is noteworthy in that it comprises at least one elementary conveyor formed, on the one hand, by two side plates facing each other, each side plate being equipped with straight and/or circular facing guide channels, and by a notched belt moving translationally and/or rotationally near the guide channels and, on the other hand, by one or more support members whose base includes at least two pegs engaged in the guide channels and in the notches of the notched belt, this making it possible to drive on the one hand, and to guide on the other hand, said support member or members translationally/rotationally.

The system for translationally/rotationally conveying a support member, which is the subject of the invention, finds application in the production of automatic machines or automatic plants for cable manufacturing or, more generally, of transfer machines.

Figure 1B:
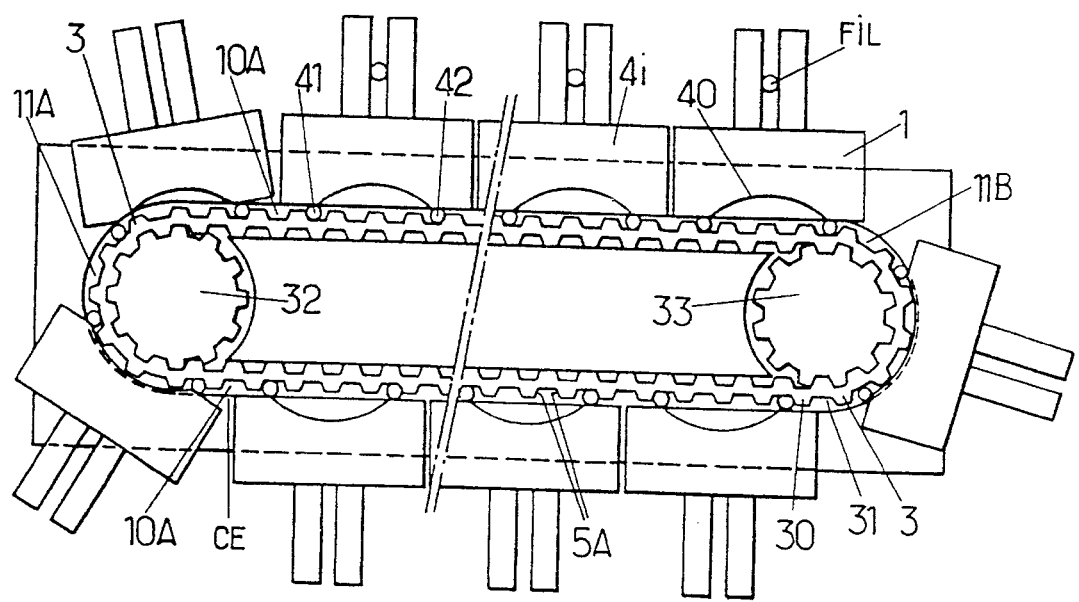
Figure 4A:
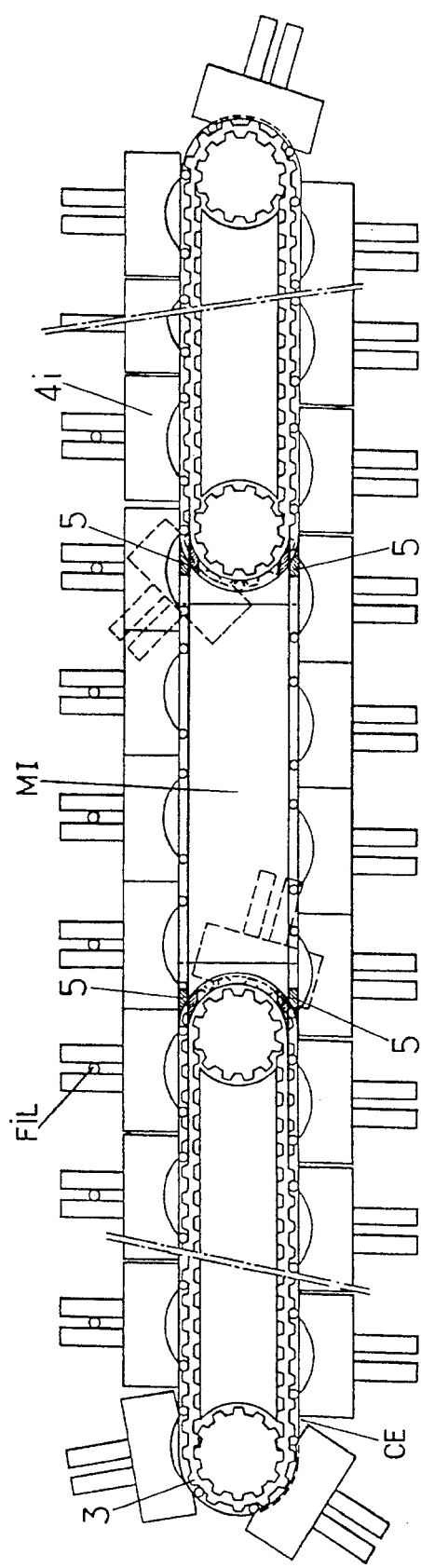
Figure 4B:
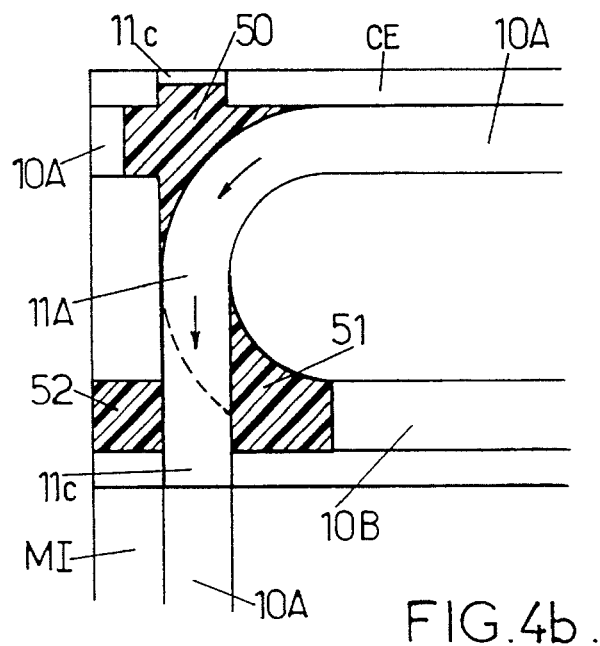
Figure 4C:
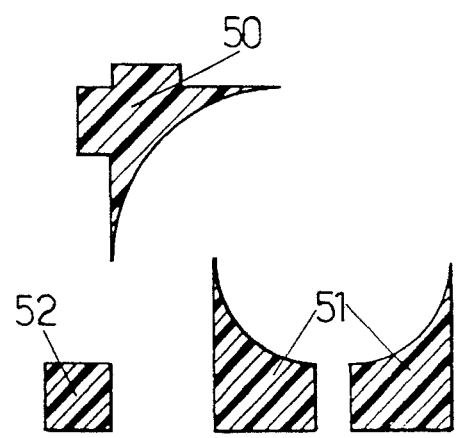
Figure 5:
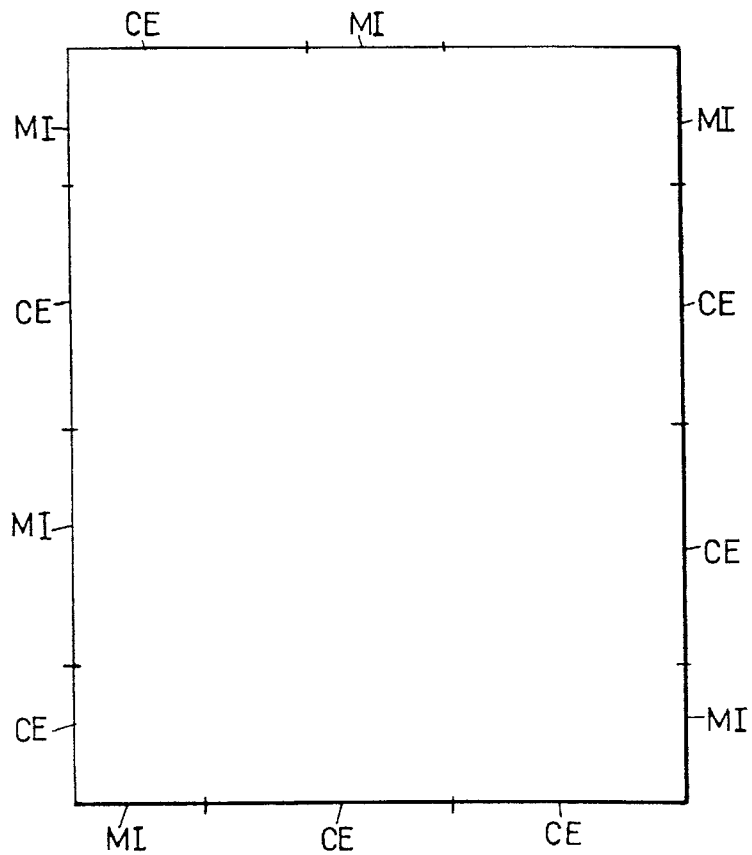

A more detailed description of a system for translationally/rotationally conveying support members, in accordance with the subject of the invention, will be given hereinbelow in conjunction with the drawings, in which FIG. 1a represents, in perspective, a view of an elementary conveyor permitting production of a conveying system in accordance with the subject of the present invention, FIG. 1b represents a sectional view, in a plane of longitudinal symmetry, of the elementary conveyor represented in FIG. 1a, FIG. 2a represents, in section, an embodiment variant of a conveying system in accordance with the subject of the present invention, in which two elementary conveyors according to the invention are aligned end to end, FIG. 2b represents, in section, an embodiment variant of a conveying system in accordance with the subject of the present invention according to FIG. 2a, but in which an interface module has been inserted between the two elementary conveyors joined end to end, FIG. 3a represents a perspective view of a particularly advantageous support member intended to equip a conveying system in accordance with the subject of the present invention, FIG. 3b represents a front view of FIG. 3a, in which the profile of the pegs and teeth of the support member have been displayed, FIG. 3c, 3d and 3e represents three successive stages in the translational/rotational driving of the support member represented in FIG. 3a, 3b and, in particular, of the pegs of the said support member, FIG. 4a represents a particularly advantageous embodiment variant of the conveying system of FIGS. 1b and 2b, in which a routing system has been provided, FIG. 4b and 4c represent an embodiment variant of FIG. 4a, in which a routing system makes it possible to produce a 90° running rotation, branch-off guide channels being provided at the top of the circular guide channels, wherein FIG. 4c shows certain elements viewed from the right end of FIG. 4b, FIG. 5 represents, in a vertical plane, any polygonal configuration capable of being employed by virtue of the use of a plurality of elementary conveyors respectively of interfacing modules in accordance with the subject of the present invention.

The system for translationally/rotationally conveying a support member in accordance with the subject of the present invention will now be described with FIG. 1a and 1b.

As will be observed in FIG. 1a, the conveying system according to the invention comprises an elementary conveyor, denoted by CE, formed, on the one hand, by two facing side plates, each denoted by 1 and 2 respectively, each side plate being equipped with facing guide channels. These channels, referenced by 10, may be straight and/or circular, the latter bearing the reference 11. The elementary conveyor CE furthemore includes a notched belt 3 moving translationally and/or rotationally near the aforementioned guide channels 10 and 11, the notched belt 3 following, by virtue of a set of pulleys, which will be described subsequently in the description, the path defined by the guide channels.

As will furthermore be observed in FIG. 1a, the elementary conveyor CE includes, on the one hand, one or more support members, denoted by 4, whose base includes at least two pegs, denoted by 41, engaged in the guide channels, 10 and 11 respectively, and in the notches 30, 31 of the notched belt 3. By way of indication, the notched belt 3 is formed by a succession of notches or recesses 30 followed by steps 31.

Since each support member 4 is thus engaged, on the one hand, in the guide channels and, on the other hand, in the notches of the notched belt 3, this operating mode makes it possible not only to drive but also to guide, translationally/rotationally, any support member 4 thus arranged. It is of course understood that, in FIG. 1a, a single support member 4 has been represented so as not to clutter the drawings.

It is indicated, moreover, that the notched belt 3 can be advantageously set in translational/rotational movement by means of drive pulleys whose drive spindle, denoted by 20, may be formed by a spindle passing through the side plates 1 and 2 respectively. By way of example, advantageously and implying no limitation, support members 21 and attachment members 210 may be provided on each side plate 1 and 2 respectively, so as to permit attachment of a drive motor which may advantageously be constituted by a stepper motor. This motor is not represented in the drawing.

More generally, it is understood that the aforementioned drive motor may then be controlled using conventional techniques for controlling stepper motors.

FIG. 1b represents a section of FIG. 1a in the plane PP of longitudinal symmetry of the elementary conveyor CE.

In a non-limiting embodiment as represented in FIG. 1b, each side plate 1 and 2 respectively includes at least two parallel straight channels, denoted by 10A and 10B respectively, these parallel straight channels being connected together at their ends by a circular channel 11A, 11B. In the non-limiting embodiment represented in FIG. 1b, the set of straight and circular channels thus form a single closed-circuit guide channel.

In the same FIG. 1b, it is indicated that the drive pulleys bear the references 32 and 33. The notched belt 3 may then be produced by a belt with double notching on each of its faces, the drive being provided by the inner face of the notched belt by means of toothed wheels integral with the aforementioned pulleys.

FIG. 1b represents a plurality of support members 4, the current support member bearing the reference 4i. It is pointed out that the number of support member 4i may be any number for a given elementary conveyor CE and is limited only by the relative bulk of each support member 4i placed end to end.

It is pointed out that each support member 4i may be formed by a monolithic base whose superstructure may be associated with any member for gripping and holding an article to be transported, such as one or more electrical wires, in the case where the conveying system forming the subject of the present invention is applied to the production of flexible linear cable-making plants. For a more detailed description of this type of gripping member or gripper, it will be useful to refer to the aforementioned European Patent Application EP-88 430,017, of which the Applicant Company is the proprietor.

According to a non-limiting embodiment represented also in FIG. 1b, the base of the support members 4i may include at least two pegs 41, 42 engaged in the guide channels of the aforementioned side plates 1 and 2.

According to the same embodiment previously mentioned, the base of each support member 4i furthermore includes teeth engaged in the notches 30, 31 of the notched belt, in particular in the steps 31 of the latter.

It is understood that, advantageously, the profile of the teeth permits continuous contact between the walls of the teeth and the walls of the notches 30, 31 of the notched belt 3, whatever the translational and/or rotational movement imparted to the support 4i by the notched belt 3.

In a non-limiting embodiment such as represented in FIG. 1b, it is understood that the pegs and teeth are constituted, for example, by a cylindrical member added to the lower face of the base of each support member 4i. This cylindrical member has a length greater than the distance e separating the two facing side plates 1 and 2, so as to permit insertion of the end of the aforementioned cylindrical members into the facing guide channels of each side plate, as represented in FIG. 1a and 1b. Furthermore, each cylindrical member is also engaged in a step 31 of the notched belt, as represented in FIG. 1b. The lower face of the base of each support member 4i may then include a cylindrical concave surface, denoted by 40, and this, having a radius of curvature substantially equal to that of the notched belt driven by the pulley 32 or 33, enables, as represented in FIG. 1b, the current support member to be rotated freely about the pulley in question.

Of course, the distance between the cylindrical members 41 or 42 constituting each peg and each tooth is determined as a function of the spacing of the notches of the notched belt 3.

According to one advantageous characteristic of a conveying system forming the subject of the present invention, such as represented in FIG. 1b, for a notched belt 3 driven translationally/rotationally by means of at least one driving pulley 32 or 33, each support member 4i, during the translation/rotation transition in driving by the notched belt 3, has an instantaneous center of rotation passing progressively from a point at infinity to a point coinciding with the center of circular guiding, that is the center of rotation of the pulley 32, 33 and of the notched belt 3. Such an arrangement makes it possible for each support member 4i to pass from translational driving movement to rotational driving movement, as represented in FIG. 1b, with a minimum of jerks imparted to the support member 4i in question. It is pointed out that as the aforementioned jerks can be caused because of the inevitable stretching of the external face of the notched belt when the latter passes from translational driving to rotational driving in line with the pulley, in the case where the support members 4i are rigidly connected to the notched belt 3, these jerks are, on the contrary, prevented because of the fact that, in the absence of rigid connection, the blocking of the support member 4i in question is simply modified progressively, with elimination of the corresponding risks of jerking.

From the practical standpoint, it is pointed out that each side plate 1, 2 may be formed by a metal plate made of aluminum alloy for example, in the thickness of which the guide channel or channels 10a, 10b, 11a and 11b are, for example, formed by machining. By way of non-limiting example, it is pointed out that the channels may be replaced by slideways added to the side plates.

It is also pointed out that the base of each support member 4i may be formed from a self-lubricating plastic such as, for example, polytetrafluoroethylene.

Various embodiments of an elementary conveyor CE, making it possible to employ a conveying system in accordance with the subject of the present invention, will now be described in conjunction with FIGS. 2a and 2b.

As will be observed in FIG. 2a, an elementary conveyor CE may include at least two facing side plates 1, 2 equipped with two parallel straight guide channels connected at one of their ends by a circular guide channel, the parallel guide channels being, however, open at their other ends.

As represented in FIG. 2a, the two elementary conveyors CE may then be placed end to end at the open ends of their straight guide line, this making it possible, of course, to obtain a conveying system in accordance with the subject of the present invention, formed by two elementary conveyors CE. It is pointed out in this respect that the connection zone of the two elementary conveyors CE may be substantially of any length, each current support member 4i in such a connection zone, in the absence of driving by a notched belt, then being, however, driven translationally by the successive support members, as represented in the aforementioned FIG. 2a.

It is thus possible, as represented in FIG. 2b, to increase significantly the transfer length of the conveying system forming the subject of the present invention by providing, as represented in the aforementioned figure, an interfacing module, denoted by MI, which may, for example, be simply formed by two facing side plates denoted by 1 MI and 2 MI respectively, and in which guide channels have been made. It is pointed out, of course, that the translational driving of each support member engaged in the guide channels of the interfacing module MI is then provided by thrust by the subsequent successive support members.

A more detailed description of a preferred embodiment of a support member 4 permitting translational/rotational driving free of any jerking phenomenon during the transition from translational driving to rotational driving will now be described in conjunction with FIGS. 3a and 3b.

In the previous embodiment of FIG. 1b, the pegs 41 are engaged both in the guide channels and in the steps of the notched belt.

In order to prevent any risk of destabilizing the support members 4i when passing from translational driving to rotational driving, or vice versa, the function of the pegs and of the teeth may be achieved, as represented in FIGS. 3a and 3b, separately, each peg 410 and each tooth 411 having a suitable profile. Of course, it is understood that the same applies to the pegs 420 and the teeth 421, which have a similar profile, symmetrical to the profile of the pegs 410 and 411 with respect to the transverse mid-plane, denoted by P'P', of the support member or of its base.

In a general manner, only the profile suitable for a peg 410 and the tooth 411 with which it is associated will be described.

As represented in particular in FIG. 3b, each peg 410 advantageously has, successively, in the direction in which the peg runs, when each support member 4 is viewed as moving in the direction D, represented by the arrow in FIG. 3b, or with respect to the guide channel for this movement, a leading edge formed successively by a plane face, denoted by 410a, a convex face, denoted by 410b, a convex transition face, denoted by 410c, and a plane face, denoted by 410d, forming a trailing edge of the peg 410 in the guide channel.

Furthermore, the profile of each tooth 411 has, successively in the same direction in which the latter runs, a plane face 411a for connection to the profile of the peg 410, and a plane leading face 411b inclined with respect to the plane connection face 441a. As will be described subsequently in the description, the angle of inclination of the inclined plane face 411b corresponds to the angle of inclination of the bearing face of the notches of the notched belt, this bearing face being denoted by SA in FIG. 1b.

The inclined plane leading face 411b is then followed by a convex cylindrical surface 411c having a defined radius of curvature and then a first plane surface 411d parallel to the connection surface 411a. Generally, it is pointed out that the convex cylindrical surface 411c is tangential to the inclined surface 411b and to the first parallel plane surface 411d. The plane surface 411d is then followed by a first concave cylindrical surface, denoted by 411e, whose profile has a point of inflection, this permitting connection to the first plane surface 411d. Finally, a second plane surface 411f is provided whose dimension in the direction of the profile corresponds to that of each notch of the notched belt, that is to say of the bearing surface SA of the latter when the notched belt is rotationally driven by the pulley 32 or 33. The second plane surface 411f is then followed by a second concave cylindrical surface 411g permitting connection to the trailing edge of the peg 410 by a cut plane denoted by 410e.

Various dimensioning elements for each support member 4 and, in particular, of the peg 410 and tooth 411 will be given in conjunction with FIGS. 3b and 3c.

On the one hand, it is pointed out that the longitudinal dimension L of each support member, or at the very least the corresponding distance L separating the plane faces, respectively 410a and 420a, of the pegs 410 and 420, is determined by the spacing of the notches of the notched belt 3. This dimension may correspond to an integral number of half-spacings of the notched belt.

It is furthermore pointed out that the radius of curvature of the convex face 410b forming the leading edge has a value substantially equal to that, denoted by R1, at the point I1 of FIGS. 3c, 3d and 3e of the radius of curvature of the external face of the guide channel 11a or 11b.

It is also pointed out that the radius of curvature of the first concave cylindrical face 411e of the profile of each tooth 411 has a value R2, as represented at the point III of FIGS. 3c through 3e, substantially equal to that of a step 31 of the notched belt 3, when the latter is in a position of rotational driving by one of the pulleys 32 or 33.

Finally, it is pointed out that the radius of curvature of the second concave cylindrical face 411g of the profile of each tooth has a value substantially equal to that, denoted by R3, of a notch 30 of the notched belt 3 when the latter is in a position of rotational driving, as represented at the point I and III of FIGS. 3c through 3e. It is pointed out that the aforementioned set of measurements allows respectively the teeth and the leading edge of each peg to be held, with constant bearing, on a notch and a step of the notched belt 3, as well as on the external edge of the guide channel, whatever the rotational and/or translational driving movement of the notched belt and of the support member 4 driven by the latter. FIG. 3c furthermore illustrates the kinetics of the transition from the translational driving movement to the rotational driving movement of each support member 4 and of the modification of the bearing surfaces of the pegs and of the corresponding teeth in the embodiment of these in FIGS. 3a and 3b.

Various embodiment variants of the conveying system, forming the subject of the present invention, will now be given in conjunction with FIGS. 4a and 4b.

FIG. 4a represents a conveying system in accordance with the subject of the present invention in the embodiment of FIG. 2b.

Furthermore, as will be observed in the aforementioned FIG. 4a, the end of each elementary conveyor CE, normally equipped with two parallel straight guide channels open at their ends and with one circular guide channel, is furthermore equipped with routing blocks 5 mounted near the junction between each straight and circular guide channel. The routing blocks 5 have a profile complementary to the profile of the straight and circular guide channels respectively. They are mounted so as to slide, for example between two positions so as to permit respectively, in a first position, connection continuity between a circular and a straight guide channel, the open end of the aforementioned straight channel being closed, and, in a second position, connection continuity between a straight guide channel and the open end of the latter, the corresponding circular guide channel being closed. In FIG. 4a, the two positions are represented for each guide block in thick and spaced-apart hatching respectively. Of course, it is understood that the sliding mounting of the guide blocks 5 may be achieved conventionally, which, for this reason, will not be described, or that, in a simpler embodiment, the guide blocks having a shape adapted to the intersection of the various channels at the junction thereof may be forcibly inserted into these channels, so as to reconstitute the desired routing profile. By way of example, it is pointed out that the guide blocks may be produced from a self-lubricating material such as polytetrafluoroethylene, previously mentioned for the production of the base of each support member 4i.

Furthermore, as represented in FIGS. 4b and 4c, each circular guide channel, 11a for example, may be completed at its periphery and at the top thereof by at least one straight routing guide channel forming a branch-off channel, denoted by 11c, which is oblique with respect to the straight guide channels 10a and 10b.

In the embodiment of FIGS. 4b and 4c, it is noted that the oblique straight routing guide channels are, in fact, represented in a non-limiting particular case in which they are, in fact, perpendicular to the straight guide channels 10a and 10b. It is pointed out that this representation is not limiting, it being possible for the current embodiments to be limited to the case where the circular guide channels are completed by straight routing channels perpendicular to the straight guide channels.

It is then understood, as represented in FIG. 4c, that the corresponding routing may be configured by means of routing blocks 50, 51, 52 shaped for this purpose. The aforementioned routing blocks may then consist of a set of routing blocks permitting a configuration of each elementary conveyor CE depending on the desired use of these. Thus, in FIG. 4b, the forcible insertion of the blocks 50, 51 and 52 permits 90° rotation routing, with a view to branching off towards an interfacing module MI whose guide channel 10a is placed in the extension of a straight routing channel 11c of the corresponding elementary conveyor CE.

It is thus possible, as represented in FIG. 5, to produce a conveying system comprising a plurality of elementary conveyors CE and of interfacing modules MI, all these elements then being configured in a completely parametrable and configurable polygonal structure depending on the actual requirements of the user. The aforementioned configuration is then produced in a substantially vertical plane, for example, this making it possible to further reduce the floor-area requirement of a chain constituted by a plurality of workstations distributed over the entire conveying system thus formed.

A system has thus been described for translationally/rotationally conveying a support member, which is particularly successful in so far as it constitutes a system for guiding and driving a set of support members to be guided and moved, in which system these support members are not definitively integral with the driving system, as they are in the devices or systems of the prior art, this making it possible, by virtue of the possibility of temporarily and locally modifying the form of the guiding, to disconnect each support member from the driving system.

We claim:

1. System for translationally/rotationally conveying a support member, comprising at least one elementary conveyor formed, on the one hand, by two side plates facing each other, each side plate being equipped with straight and/or circular facing guide channels, and by a notched belt moving translationally and/or rotationally near said guide channels and, on the other hand, by one or more support members whose base includes at least two pegs engaged in the guide channels and in the notches of the notched belt, in order to drive on the one hand, and to guide on the other hand, said support member or members translationally/rotationally, characterized in that the base of said support members includes at least two pegs engaged in said guide channels of said side plates, said base further including teeth engaged in the notches and steps of said notched belt, each notch and each peg having a suitable profile, the profile of the teeth permitting continuous contact between the walls of the teeth and the walls of the notches and steps of said notched belt, whatever the translational and/or rotational movement imparted to said supports by said notched belt.

2. System according to claim 1, characterized in that each side plate includes at least two parallel straight channels connected together at their ends by a circular channel, the set of said straight and circular channels forming a single closed-circuit guide channel.

3. System according to claims 1, characterized in that each peg and each tooth has a suitable profile, the profile of each peg having, successively in the direction in which the latter runs with respect to the guide channel:

a leading edge formed successively by a plane face, a convex face, a convex transition face, a plane face forming a trailing edge of the peg in the guide channel, the profile of each tooth having, successively in the direction in which the latter runs, a plane face for connection to the profile of said peg, a plane leading face inclined with respect to said plane connection face, the angle of inclination corresponding to the angle of inclination of the bearing face of the notches of said notched belt, a convex cylindrical surface of defined radius of curvature, a first plane surface parallel to said connection surface, said convex cylindrical surface being tangential to the inclined surface and to the parallel plane surface, a first concave cylindrical surface whose profile has a point of inflection permitting connection to said convex cylindrical surface, a second plane surface whose dimension in the direction of the profile corresponds to that of each notch of the notched belt in the bend, and a second concave cylindrical surface permitting connection to the trailing edge by a cut plane.

4. System according to claim 3, characterized in that
the radius of curvature of the convex face forming the leading edge has a value substantially equal to that of the radius of curvature of the external face of the guide channel, the radius of curvature of the first concave cylindrical face of the profile of each tooth has a value substantially equal to that of a step of the notched belt, when the latter is in a position of rotational driving, the radius of curvature of the second concave cylindrical face of the profile of each tooth has a value substantially equal to that of a notch of the notched belt when the latter is in position of rotational driving, which permits constant bearing holding respectively of the teeth and of the edge and attack of each peg respectively on a notch and a step of the notched belt and on the external edge of the channel the guiding, whatever the rotational and/or translational driving movement by the notched belt.

5. System according to claim 1, characterized in that for a notched belt driven translationally/rotationally by means of at least one driving pulley, each support member, during the translation/rotation transition in driving by said belt, has an instantaneous center of rotation passing progressively from a point at infinity to a point coinciding with the center of circular guiding.

6. System according to claim 6, characterized in that each side plate is formed by a metal plate in the thickness of which the guide channel or channels are formed, the base of said support members being formed from a self-lubricating plastic.

7. System according to claim 6, characterized in that an elementary conveyor includes at least:

two facing side plates equipped with two parallel straight guide channels connected at their ends by a circular guide channel, these parallel guide channels being open at their ends, routing blocks mounted near the junction between each straight and circular guide channel, the junction blocks having a profile complementary to the profile of the straight and circular guide channels respectively, and being mounted so as to slide between two positions so as to permit respectively, in a first position, connection continuity between a circular and a straight guide channel, the open end of said straight channel being closed, and, in a second position, connection continuity between a straight guide channel and the open end of the latter, the corresponding circular guide channel being closed.

8. System according to claims 1, characterized in that each circular guide channel is completed at its periphery by at least one straight routing guide channel which is oblique with respect to said straight guide channels.

9. System according to claims 1, characterized in that it comprises a plurality of aligned elementary conveyors.

* * * * *